US008643665B2

(12) United States Patent
Weihing et al.

(10) Patent No.: US 8,643,665 B2
(45) Date of Patent: Feb. 4, 2014

(54) METHOD FOR TRANSFORMATION OF COLOUR VALUES

(75) Inventors: Joerg Weihing, Tuebingen (DE); David Radtke, Tuebingen (DE); Juergen Wurster, Dettenhausen (DE)

(73) Assignee: GMG GmbH & Co. KG (DE)

( * ) Notice: Subject to any disclaimer, the term of this patent is extended or adjusted under 35 U.S.C. 154(b) by 843 days.

(21) Appl. No.: 12/085,855

(22) PCT Filed: Feb. 15, 2007

(86) PCT No.: PCT/EP2007/001308
§ 371 (c)(1),
(2), (4) Date: Jul. 19, 2010

(87) PCT Pub. No.: WO2007/093411
PCT Pub. Date: Aug. 23, 2007

(65) Prior Publication Data
US 2010/0277499 A1 Nov. 4, 2010

(30) Foreign Application Priority Data
Feb. 17, 2006 (DE) .......................... 10 2006 007 852

(51) Int. Cl.
*G09G 5/02* (2006.01)
(52) U.S. Cl.
USPC ........................................................ 345/590
(58) Field of Classification Search
None
See application file for complete search history.

(56) References Cited

U.S. PATENT DOCUMENTS

| 5,933,578 | A | 8/1999 | Van de Capelle et al. |
| 7,423,778 | B2 | 9/2008 | Hersch et al. |
| 2004/0056867 | A1 | 3/2004 | Cui et al. |
| 2005/0094209 | A1 | 5/2005 | Hasler et al. |
| 2006/0007252 | A1 | 1/2006 | Mahy et al. |

FOREIGN PATENT DOCUMENTS

| EP | 1 768 381 | 3/2007 |
| EP | 1 768 381 A | 3/2007 |
| WO | 98/46008 | 10/1998 |

OTHER PUBLICATIONS

Translation of International Preliminary Report on Patentability for PCT/EP2007/001308 (Oct. 21, 2008).
Braun, K., et al.: "Development and Evaluation of Six Gamut-Mapping Algorithms for Pictorial Images", Proceedings of the 7th IS&T/SID Color Imaging Conference, Nov. 16, 1999, pp. 144-148, XP008078678, p. 145: "L* compression (followed by Nearest-Point Clipping)" (in English).
Braun, G., et al.: "Gamut Mapping for Pictorial Images", TAGA Proceedings, 1999, pp. 645-660, XP008078676, pp. 646-652 (in English).

(Continued)

*Primary Examiner* — Ryan R Yang
(74) *Attorney, Agent, or Firm* — Harness, Dickey & Pierce, P.L.C.

(57) ABSTRACT

A method for transformation of color values of an initial color space reproducible by a first technical device to color values of a target color space reproducible by a second technical device is provided. The method includes movement from one color space by conversion of color values to different color values in the basic color space and scaling by conversion to different color values in the basic color space. The method also includes conversion of color values of the initial color space to color values which are closest to the color value in the edge area of the target color space. The method also includes movement of color values located in an edge area of the target color space to the interior of the target color space by conversion as a function of the number of identical edge color values to color values on the same color variation plane.

1 Claim, 7 Drawing Sheets

(56) References Cited

OTHER PUBLICATIONS

Hersch R D, et al: "Spectral reflection and dot surface prediction models for color halftone prints", Journal of Electronic Imaging, Bd. 14, Nr. 3, 033001, Jul. 2005, Seiten 1-12, XP002601998 SPIE-Int, Soc. Opt. Eng USA ISSN: 1017-9909 DOI: 10.1117/1.1989987 Section 4 *Seiten 5-6; Abbildung 4*.

Ruckdeschel F. R. et al: "Yule-Nielsen effect in printing: a physical analysis", Applied Optics, Optical Society of America, US, Bd. 17, Nr. 21, Nov. 1, 1978, Seiten 3376-3383, XP002319741 ISSN: 0003-6935 *das ganze Dokument*.

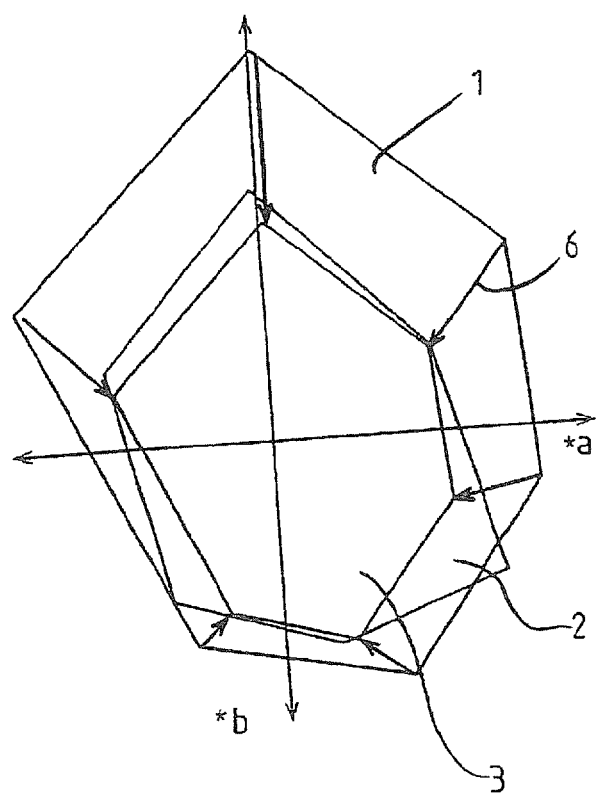

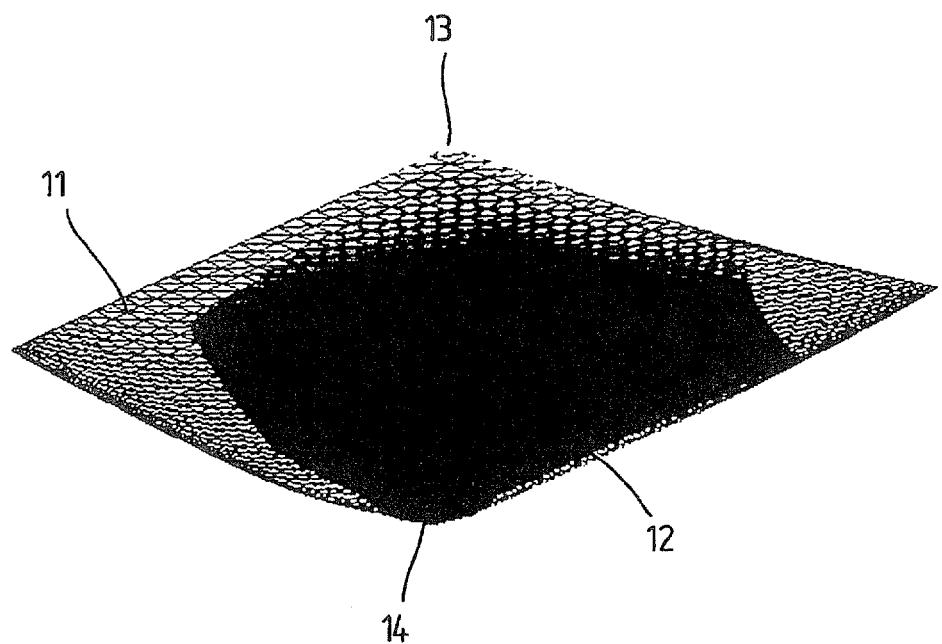

12

METHOD FOR TRANSFORMATION OF COLOUR VALUES

The present invention relates to a method for transformation of colour values from an initial colour space to a target colour space.

TECHNOLOGICAL BACKGROUND

Colours which can be differentiated by humans are generated by the light having different wave lengths. Each wave length has its own colour. The human eye has receptors which react to different wave lengths. One receptor which is adjusted for the red component, one receptor which is adjusted for the green component, and one receptor which is adjusted for the blue component of light that meets the eye make it possible at the definition by a standard observer to divide each spectral curve into the three numerical values XYZ. For the industrial reproduction of colours, however, this description is not sufficient, and the numerical values correlate only little with the visually perceived colour properties. The colour effect is produced in the brain, after the reception of a light spectrum through the eye. The colour stimulus is the physically measurable radiation which originates in a light source and which is reflected from the observed body. The colour valency can be physically measured and is used for this reason as a basis for colour models.

Originally developed two-colour models comprised a two-dimensional colour chart (x, y) that was varied through a brightness value (Y). It turned out as a problem in this colour model that intervals which were perceived as being equal did not automatically correspond to equal numerical intervals.

Figure 1:
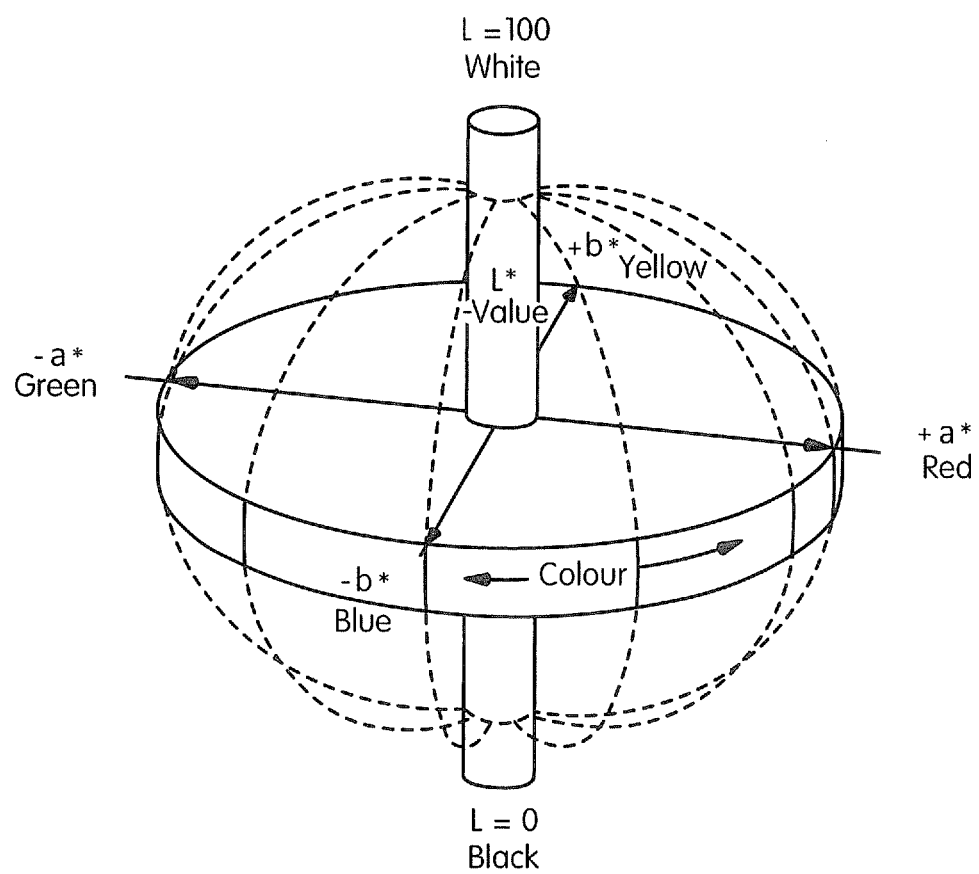

Having realized that a colour can never be blue and yellow or red and green at the same time, the Lab colour model was developed on the basis of the colour-opponent theory. L* describes the brightness, a* the red/green value, and b* the yellow/blue value of a colour. FIG. 1 is a schematic representation of the Lab model. The definition of a colour in accordance with the Lab model is device-independent.

A great number of technical devices, colour monitors, scanners, slide recorders, slide projectors, digital cameras and the like work according to an additive colour model. When the additive luminous colours red, green and blue are projected one onto the other, the same add up to white. An increasing colour intensity makes the image brighter. Conventionally, 256 colour value ranges from 0 (no colour) to 255 (full colour) are rendered measurable. We are talking about the RGB colour model which also allows to use percentages instead of the colour value ranges for the three colours. Therefore, in digital processing according to the RGB model 3 bits per pixel are required, and totally 16.7 million colours may be obtained from the product of 256×256×256.

However, the matter is different with the application of colour. Printers, printing machines and the like do not use luminous colours, but opaque primary colours. The subtractive colour model has been developed for this purpose. The more colours are printed one over the other, the darker the result will be. All the colours in their full intensity over each other result in black. These colours are cyan (green/blue), yellow and magenta (purple). Black is additionally used. Yellow, green/blue and magenta are produced by mixing two of the additive primary colours red, green and blue respectively in equal shares. Although, when printed over each other, yellow and purple theoretically result in black, the result will yet be a dark grey or brown in terms of the printing strategy. Hence, by the additional use of black the sensation of intensity is enhanced and ink is saved in addition. From the English terms of the colours Cyan, Yellow, Magenta and a conversion to black, which conversion results in a K-value, the CMYK colour model has been developed.

It is obvious that in a CMYK colour model high values produce dark shades, while in a RGB colour model high values produce light shades. Hence, an image printed with a high contrast appears pale on the monitor. For this reason, but also to make the reproduction on similar systems compatible, it is required to convert colour values of an initial colour space to a target colour space.

PRIOR ART

For the conversion of colour values from one colour space to another an ICC standard has been fixed.

If the initial colour space and the target colour space are equally large and for instance also of the same kind or if the target colour space is even larger than the initial colour space, each colour value of the initial colour space may be mapped onto a corresponding colour value of the target colour space. This way does not require special measures to be taken.

Problems occur when for instance colour spaces of different colour models are to be mapped onto each other. The above-described RGB colour space frequently has a clearly larger gamut than the CMYK colour space of a printing system or the like. The number of the maximum reproducible colours of a colour space is called "gamut". From this term the term gamut mapping was derived which stands for strategies that may be used for replacing colours of the initial colour space which cannot be reproduced anymore by colours of the target colour space, without changing the overall colour effect of the final result.

The ICC standard knows a method which is called colorimetric rendering intent (colorimetrics). If the target colour space is as large as or larger than the source colour space, each input value in the target colour space will be visually identically reproduced, since the smallest delta-E distance is the criterion of the colour transformation.

It is used for instance in the simulation of an offset-print with CMYK data by a digital proof-printer. The gamut of a digital proof-printer is a rule larger than that of the offset print. In the simulation of the offset the print colours are transformed by the printing profile according to Lab and are then converted by the colorimetric rendering intent of the proof-printer profile.

Figure 2:
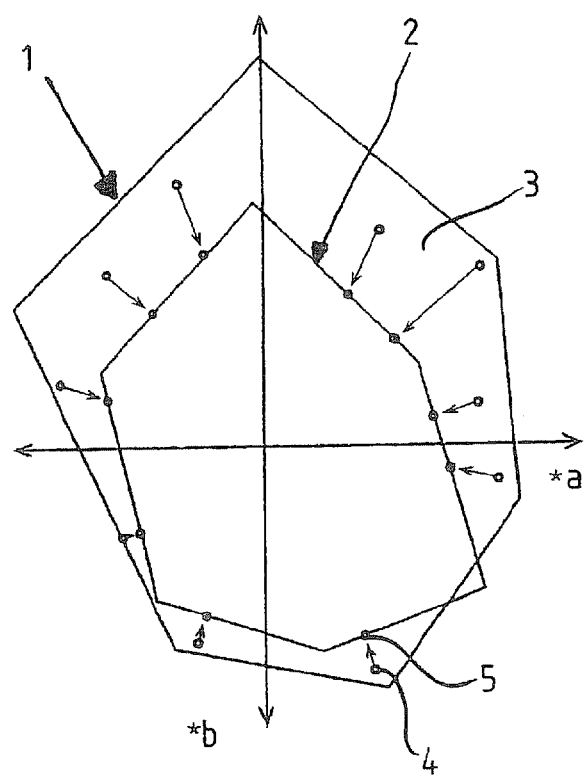

If the conversion takes place from a large to a smaller colour space, not all of the reproducible colours are downwardly converted to the next printable colour. The larger colour space is cut off at the boundaries of the printable part. The colour values of the source medium which are located inside of the target medium are not changed. FIG. 2 shows a schematic representation of this method. In this method, practically all colours of the larger source colour space which are not reproducible anymore are respectively mapped onto the boundary points of the smaller target colour space, i.e. the protruding edge of the source colour space is practically cut off.

A further method of the ICC standard is called photographic rendering intent (perceptual). This rendering intent serves for the transformation from a large to a small colour space. Taking the paper, dynamic and colour properties of the output system into account, the entire colour space is compressed. In doing this, one proceeds in such a way that the human eye will perceive the reproduction in the target colour space as true to the original as possible. All of the colour values contained in the image are modified, independently of the fact whether they are located already inside the reproducible colour range of the target colour space or outside thereof. After the colour transformation the image is balanced in terms of colour, but it may appear rather pale, since frequently the values for chromaticity are reduced.

The photographic rendering intent is used for example at the translation of a RGB into a CMYK colour space. FIG. 3 shows a schematic representation according to which the larger source colour space is "compressed" into the smaller target colour space.

If the colours of the larger colour space are cut off at the boundary of the target colour space as in the first method, this will especially result in a loss of optical details, above all in the dark zones. According to the second method, the colours fit into the new colour space, but this at the expense of the contrast. Both methods do not lead to satisfying colour results that may be used in all cases.

DESCRIPTION OF THE INVENTION

In view of the above-described prior art the invention is based on the object of providing a method for transformation of an initial colour space to a target colour space, which method avoids the aforementioned drawbacks, hence especially minimizes an excessive compression of the colour space, losses of details and losses of contrast. As a person having ordinary skill in the art is aware, the method for transformation of colour values is performed by a gamut transformation device, which may be a device located between a first device (for example a video source or an editing system) and a second device (for example an output device such as a monitor).

The technical solution of this object results from a method according to patent claim 1.

In the following further advantages and features of the invention will be described which, in particular, are essential for the invention also individually.

According to the invention, an initial colour space and a target colour space are assumed, both of which are related to a defined basic colour space. The initial and the target colour space may correspond to the same model. For instance, the colour space of a digital printer may be larger than the colour space of an offset printing machine, although both are controlled in the CMYK system. But both colour spaces may also be assigned to different colour models; a digital camera image for instance is described in the initial colour space RGB, which image must be transformed to the target colour space CMYK before printing. Both colour spaces may be represented relative to a basic colour space, for instance Lab, but also xyY or XYZ. In the colour spaces at least one plane or one axis, mostly however a central space, will define a profile of brightness. Planes which as rule run perpendicularly or transversely thereto define the respective colour variations.

According to the invention, the initial colour space and the target colour space are first of all made to coincide at least with respect to a colour value that is located at the edge of a colour space. To this end, each colour value of said one colour space is converted to a corresponding colour value in the basic colour space, so that at least one edge colour value of the colour space that is produced by the conversion is identical with the same edge colour value of said other colour space. Accordingly, it lends itself to use for instance that colour value range which describes the brightest and/or the white point. Hence, the initial colour space and the target colour space correspond at least in the white point. In order to perform this, the distance for instance of the white point of the initial colour space to the white point of the target colour space is detected, and for each point of the initial colour space the colour value is moved by the same distance within the basic colour space. Hence, the initial colour space and the target colour space correspond with respect to the white point. Normally however, any other clearly determinable point may be used.

According to a further step a second corresponding colour value point of both colour spaces is fixed now by scaling, and each point of said one colour space is moved to an extent such as to correspond also in a second point. To this end, it lends itself to use the darkest brightness value, practically the black point, if the white point has been chosen for the first corresponding colour value. Then it lends itself to scale down the larger colour space. For this purpose, the ratio of the brightness intervals between white point and black point of the smaller colour space in relation to the ratio between white point and black point of the larger colour space may be used. This relation multiplied by the interval of the respective colour value to be moved causes that the colour values are increasingly less moved from dark to light.

The movement is preferably performed parallel to the connection axis between the first coinciding colour value and the second coinciding colour value. The result of this scaling operation are two coinciding colour spaces which in any case correspond with each other with respect to the plane or the space between the first and the second coinciding colour value. In the edge areas the scaling may produce both an area in which the initial colour space includes colour values which are outside of the target colour space and vice verse.

In a further step, each colour value of the initial colour space which is outside of the target colour space is now converted to the colour value of the target colour space which is closest to the colour value of the initial colour space. Accordingly, these are colour values which are located in the edge areas of the target space and which are occupied several times. This conversion is registered.

Referring to the target colour space, an edge area is selected now plane by plane, of which the thickness depends on the number of the equally occupied edge colour values.

Therefore, if the respective colour variation plane that is observed exhibits an edge value which is occupied multiple times, because a plurality of colour values of the initial colour space has be transformed to this edge colour value of the target colour space, a corresponding number of colour values that are located further back in the colour space is moved according to a predetermined function to the interior of the target colour space, i.e. transformed to colour values that are located further back. This step is repeated, with the thickness of the movement range also decreasing because of the decreasing number of equally occupied colour values, until only a predetermined number of equally occupied colour values are achieved.

In the practice this last-described strategy corresponds to smoothing a curve. If, as shown in FIG. 4, the colour value curve for a colour variation beam of the target colour space is entered in a coordinate system, it will be shown that the curve includes on its end a plurality of equally occupied colour values. Depending on this number, a corresponding area of colour values located further to the front is moved to the interior in a smoothing fashion. The number of equally occupied colour values decreases and the curve becomes smoother, until, as shown in FIG. 4c, a well-smoothed curve of colour values that may be reproduced in the target colour space is achieved.

With the method according to the invention it is achieved that the loss of details is reduced to a minimum at least in the saturated colour areas. In addition to that, the gamma may be maintained as far as possible.

Hence, in the target colour space which is obtained a colour value which is located inside of the target colour space exists for each colour value of the initial colour space. But due to the transformation laws that are used, reproductions may by made now by means of the target colour space which substantially correspond to the original in the initial colour space, especially reproductions which appear identical to the human eye in terms of details and contrast.

A further new and independently inventive improvement will become apparent from the following description. In the method step comprising the scaling of a colour space towards the other colour space, whether with or without previous shifting of said one colour space with respect to the other, the matter is about moving colour values at the distinctive edge areas of said one colour space onto comparably distinctive colour values at the edge area of said other colour space and from there moving all the colour values of said one colour space according to a predetermined law in a corresponding parallelism according to a predetermined relation. In this way colour spaces are made to coincide at least in lines or planes. As illustrated above, a distance ratio multiplied by the changing distance may be used for defining the colour value movement for each individual point and to make one colour space in this way coincide with a second colour space in terms of its extension at least in one direction or along one plane.

In a way essential to the invention and in accordance with the invention it is now proposed to overlay the mapping law by a function, by which the amounts of the movements of the colour values to other colour values may be additionally influenced. For instance an S-curve may be overlaid in such a way that larger movements take place at larger intervals and smaller movements at smaller intervals in addition to the linear or distance-responsive movement rules. In this way, bright values may be moved only little, while dark values may be moved to a large extent.

Another measure which is also new, independently inventive and essential to the invention is substantially concerned with obtaining the run of the so-called grey axis in the initial colour space during any kind of transformation.

In colour spaces the grey axis normally is the distance between the white point and the black point, which however is to be seen less in a linear form than in the form of a three-dimensional column. Now, if a colour space is moved, scaled or mapped in any other way onto a different colour space, this will lead as rule to that the colour values which are located along the grey axis are also carried to target colour values, where the same are modified for instance in terms of colours. Quite generally, this may apply for a concrete colour space, but also for other planes, axes, individual colours or the like. Instead of the grey axis colour values the strategy according to the present invention may be applied for instance also to a colour plane, a colour beam, a brightness area or the like.

According to the invention, the original position of the colour value areas which shall be obtained is registered in the same way as either the processing steps like shifting, scaling, transforming or the like and/or the concrete target colour values. A back-shifting is then performed by way of a function for at least a part of the registered colour values. It may also be provided that a beam, an axis or an area is surrounded by a space and is back-shifted according to predetermined rules.

When obtaining the grey axis for instance, the shift/movement may be selected smaller depending on the brightness of the value, hence the more the black point is approached the larger may be the movement With this invention it is possible to selectively back-transform colour value areas at least approximately towards their origin, wherein this may be performed in a differentiated fashion as a function of parameters. In this way, a visual correspondence between the grey axis of the initial colour space and the grey axis of the target colour space can be guaranteed.

A further novelty according to the invention and essential to the invention relates to a method according to which individual colour values or colour value areas may be corrected. To this end, an individual colour value or colour vlaue area is fixed in the initial colour space, and in the allocation table the appropriate colour value of the target colour space is modified in the desired way, hence moved for instance to a brighter colour value, to a darker value or also changed in terms of the colour direction.

According to the invention it is now provided to surround the selected colour value or colour value area in a predetermined virtual three-dimensional structure, for instance a ball, an oval or also non-circular bodies. This results in an amount of colour values defining a geometrical body around the colour value to be corrected. In accordance with a function that takes the distance of the respective colour value to the selected colour value into account, a movement of the entire body is performed in the allocation list of the colour values of the target colour space. The more a colour value is distant from the selected colour value the smaller is its movement which is performed. It is achieved in this way that in the reproductions the modified colour value areas are practically fit into their surroundings with a smooth transition.

Figure 4A:
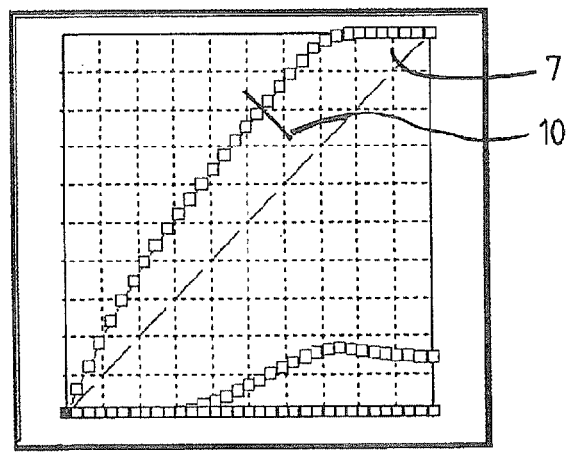
Figure 4B:
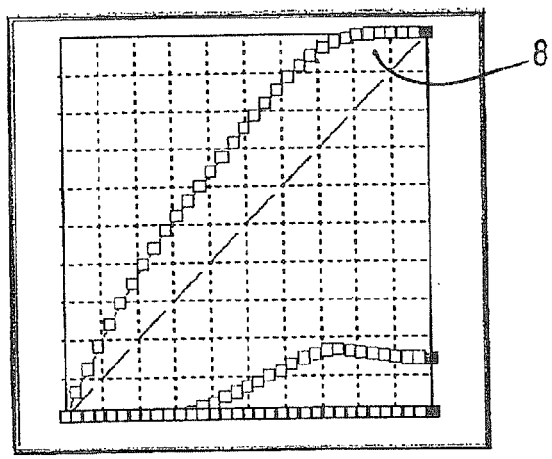
Figure 4C:
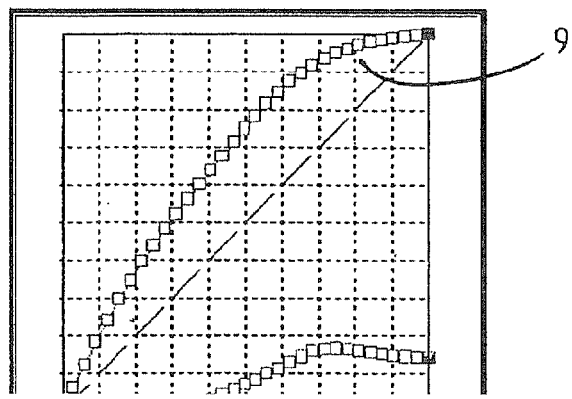
Figure 5A:
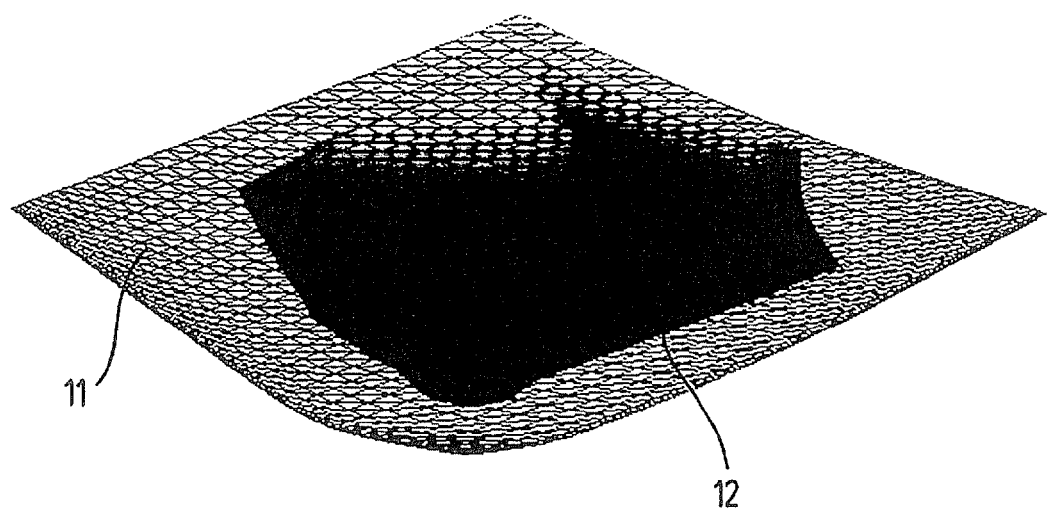
Figure 5C:
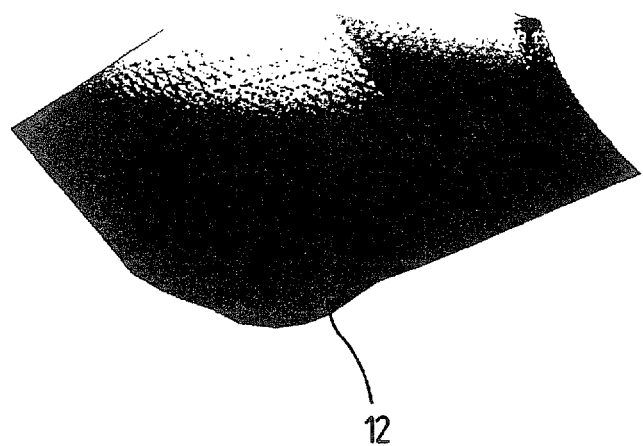

Further advantages and features of the invention will become apparent from the following description of one embodiment with reference to the drawings, wherein it is shown by:

FIG. 1 a schematic representation of the Lab model;

FIG. 2 a schematic representation for explaining the method of clipping colour spaces;

FIG. 3 a schematic representation for explaining the method of compressing a larger source colour space into a smaller target colour space;

FIG. 4a-4c colour value curves in a coordinate system for explaining the smoothing function;

FIG. 5a-5c a figurative, schematic representation for explaining the modification of a source colour space compared to a target colour space.

In a schematic representation of a Lab colour space shown in FIG. 1, the mutually exclusive pairs of colours red/green as well as blue/yellow may be recognized, which practically define the equator disk. If one proceeds from the centre towards red, hence +a*, this means that an increasingly higher share in red colour is added. The same applies for all the other directions of colour and of course corresponding blends in between. A bright/dark scale illustrated as a centre column represents the L* value which proceeds from black (L=0) to white (L=100). Hence, the result are brightness planes for the equatorial colour plane, which defines the normal area at L=50. Also, a fixed red value may be practically varied towards bright or dark, parallel to the brightness line or brightness column.

Referring to FIG. 2, it may be seen the way in which the larger source or initial colour space 1 is reduced to the smaller target colour space 2 according to the method of the colorimetric rendering intent. In accordance with this method, this is performed by that the colour values 4 which are located in the overlapping areas 3 are each converted to the colour value 5 which is located in the edge area of the target colour space 2. This is equal to clipping the overlapping parts, because if according to the allocation table colour value 4 of the initial colour space is to be printed, it is colour value 5 at the edge of the target colour space 2 that is printed. Hence, the overlapping parts 3 are clipped.

On the other hand, according to FIG. 3, the larger colour space 1 is "shrunk" or "compressed" into the smaller colour space 2 to form the final colour space 3. During this, all points of the colour space 1 are moved towards the centre by conversion, and the result is the final colour space 3 which is completely contained in the target colour space 2.

As can be seen, the colour spaces may deviate from round or symmetrical geometrical shapes, depending on the quality or capacity of the respective device. This applies for digital devices like a camera, monitor or the like, of which the ability of printing colours is described in the CMYK model.

FIGS. 5a to 5c show the transforming operation according to the invention, wherein the larger source colour space 11 is transformed to the smaller source colour space 12. First of all, the colour spaces 11 and 12 are made to coincide in terms of their white point 13, and thereafter the larger colour space 11 is moved or transformed in a scaled fashion in such a way that also the black points 14 of both colour spaces are coinciding. This is effected by moving each point of the larger colour space 11.

The overlapping parts of the colour space 11 are then in the manner according to the invention first transformed to the next limit values or boundary colour values of the smaller colour value 11, of which the edge space is then smoothed according to the inventive method.

FIG. 4 shows by way of an example the run of a curve for a colour. On the x-axis the input colour values are displayed, while on the y-axis the output colours are displayed. The x-axis proceeds from 0-100% of the respective colour. The curve shows that with an increasing colour intensity the curve proceeds towards a limit, so that in the state which is shown in FIG. 4a the result is the area 7 exhibiting substantially identical colour values. In other words, whenever a corresponding colour value is retrieved from the initial colour space, this maximum value is respectively used in the target colour space.

There is defined an area boundary 10 which essentially depends on the length of the area 7, and the colour values which are beyond this boundary are downwardly converted to a deeper area, so that, as illustrated in FIG. 4, the area 8 of identical colour values becomes smaller compared to the area illustrated in FIG. 7. This process is repeated, until a state is obtained as shown in FIG. 4c, in which the curve 9 is substantially smoothed.

The above-described embodiments are merely for the purpose of illustration and are not limiting to the invention in any respect.

List of Reference Numbers
1 initial colour space
2 target colour space
3 overlapping part
4 colour value
5 colour value
6 transformation rule
7 area of identical colour values
8 area of identical colour values
9 smoothed curve
10 limit value
11 initial colour space
12 target colour space
13 white point
14 black point

The invention claimed is:

1. A method for transformation of colour values of an initial colour space reproducible by a first technical device to colour values of a target colour space reproducible by a second technical device, both the initial colour space and the target color space being related to a defined basic colour space, wherein at least one plane in the colour spaces defines a profile of the brightness from bright to dark, and planes running transversely thereto define colour variations, characterized by the following steps (a) movement from the initial colour space reproducible by the first technical device and/or the target colour space reproducible by the second technical device by conversion of all the colour values of one of the two colour spaces to different colour values in the basic colour space, so that the initial and the target colour space coincide with respect to at least one colour value located at the edge of a colour space, (b) scaling of the initial colour space and/or target colour space by conversion of all of the colour values of one of the two colour spaces to different colour values in the basic colour space, such that the initial and the target colour space coincide with respect to at least one plane which is defined by the edge colour value, which has been made to coincide, and an essentially opposite edge colour value, (c) conversion of each colour value of the initial colour space which is outside of the target colour space to a colour value which is closest to this colour value in the edge area of the target colour space, (d) movement of the colour values which are located in a defined edge area of the target colour space to the interior of the target colour space by conversion as a function of the number of identical edge colour values in each case to colour values essentially on the same colour variation plane, until a predetermined number of identical edge colour values are achieved on the respective colour variation plane.

* * * * *